United States Patent
Bennetzen et al.

(10) Patent No.: US 9,975,790 B2
(45) Date of Patent: *May 22, 2018

(54) WATER TREATMENT SUITED FOR OIL PRODUCTION WELLS

(71) Applicant: Maersk Olie og Gas A/S, Copenhagen (DK)

(72) Inventors: Martin Vad Bennetzen, Copenhagen (DK); Kristian Mogensen, Copenhagen (DK)

(73) Assignee: MAERSK OLIE OG GAS A/S, Copenhagen (DK)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/033,486

(22) PCT Filed: Sep. 30, 2014

(86) PCT No.: PCT/EP2014/070890
§ 371 (c)(1),
(2) Date: Apr. 29, 2016

(87) PCT Pub. No.: WO2015/044444
PCT Pub. Date: Apr. 2, 2015

(65) Prior Publication Data
US 2016/0289101 A1    Oct. 6, 2016

(30) Foreign Application Priority Data
Sep. 30, 2013    (DK) .................................. 2013 70542

(51) Int. Cl.
*E21B 43/20* (2006.01)
*C02F 1/48* (2006.01)
(Continued)

(52) U.S. Cl.
CPC ............... *C02F 1/488* (2013.01); *B03C 1/01* (2013.01); *B03C 1/02* (2013.01); *B03C 1/0332* (2013.01);
(Continued)

(58) Field of Classification Search
USPC .......................................................... 210/695
See application file for complete search history.

(56) References Cited

U.S. PATENT DOCUMENTS

| 3,300,375 A | 1/1967 | Clifford |
| 3,970,518 A | 7/1976 | Giaever |
| (Continued) | | |

FOREIGN PATENT DOCUMENTS

| AU | 2012101651 A4 | 12/2012 |
| CN | 1736881 A | 2/2006 |
| (Continued) | | |

OTHER PUBLICATIONS

Arthur et al., Technical Summary of Oil Produced Water Treatment Technologies, Mar. 2005, pp. 1-60 (Year: 2005).*

(Continued)

*Primary Examiner* — Angela M DiTrani
(74) *Attorney, Agent, or Firm* — Brinks Gilson & Lione

(57) ABSTRACT

A method of depleting the bacterial content in a water source is provided. The method involves depleting the bacterial content in a water source for a water flooding process, said method comprising contacting a water source with a superparamagnetic or paramagnetic nanoparticle; complexing the bacteria with the particle; and removing the bacteria-particle complex by applying a magnetic field so as to provide a water source with depleted bacterial content. The depleted water can then be pumped into one or more connecting injection well(s) in an oil field pushing the crude oil towards (Continued)

one or more production well(s) thereby allowing for enhanced oil recovery from the production wells.

33 Claims, 2 Drawing Sheets

(51) Int. Cl.
  *B03C 1/01* (2006.01)
  *C02F 1/68* (2006.01)
  *B03C 1/033* (2006.01)
  *B03C 1/28* (2006.01)
  *B03C 1/02* (2006.01)
  *C02F 3/34* (2006.01)
  *C02F 103/02* (2006.01)
  *C02F 103/08* (2006.01)

(52) U.S. Cl.
  CPC .............. *B03C 1/288* (2013.01); *C02F 1/683* (2013.01); *E21B 43/20* (2013.01); *B03C 2201/18* (2013.01); *C02F 3/345* (2013.01); *C02F 2103/02* (2013.01); *C02F 2103/08* (2013.01); *C02F 2303/08* (2013.01); *C02F 2303/16* (2013.01); *C02F 2303/20* (2013.01); *C02F 2305/08* (2013.01)

(56) References Cited

U.S. PATENT DOCUMENTS

| | | | |
|---|---|---|---|
| 4,246,355 A | | 1/1981 | Bolto et al. |
| 4,247,398 A | | 1/1981 | Mohri |
| 4,279,756 A | | 7/1981 | Weiss et al. |
| 4,285,819 A | | 8/1981 | Yen et al. |
| 4,452,773 A | | 6/1984 | Molday |
| 4,476,027 A | | 10/1984 | Fox |
| 4,846,962 A | | 7/1989 | Yao |
| 5,230,805 A | | 7/1993 | Yates et al. |
| 5,397,476 A | | 3/1995 | Bradbury et al. |
| 5,405,531 A | * | 4/1995 | Hitzman ................ A01N 59/00 166/307 |
| 5,753,180 A | | 5/1998 | Burger |
| 5,855,790 A | | 1/1999 | Bradbury et al. |
| 6,596,182 B1 | | 7/2003 | Prenger et al. |
| 6,669,849 B1 | | 12/2003 | Nguyen et al. |
| 7,169,618 B2 | | 1/2007 | Skold |
| 8,021,540 B2 | | 9/2011 | Toida |
| 8,636,906 B2 | * | 1/2014 | Stein ..................... B03C 1/01 210/683 |
| 2003/0102255 A1 | | 6/2003 | Mahajan |
| 2004/0241428 A1 | | 12/2004 | Kohno |
| 2006/0037914 A1 | | 2/2006 | Niki et al. |
| 2007/0246426 A1 | * | 10/2007 | Collins .................. C09K 8/528 210/651 |
| 2009/0017518 A1 | | 1/2009 | Wu et al. |
| 2009/0050315 A1 | | 2/2009 | Fallon et al. |
| 2009/0120842 A1 | | 5/2009 | Koseoglu et al. |
| 2010/0051510 A1 | | 3/2010 | Lee |
| 2010/0051557 A1 | | 3/2010 | Etemad et al. |
| 2010/0059449 A1 | | 3/2010 | Grass et al. |
| 2010/0147647 A1 | | 6/2010 | Koseoglu et al. |
| 2011/0030967 A1 | | 2/2011 | Mcguire |
| 2011/0139687 A1 | | 6/2011 | Yeganeh et al. |
| 2011/0306525 A1 | | 12/2011 | Lighthelm |
| 2012/0103913 A1 | * | 5/2012 | Kiyoto ..................... B03C 1/01 210/695 |
| 2012/0145601 A1 | | 6/2012 | Lee |
| 2012/0145637 A1 | | 6/2012 | Alfadul et al. |
| 2013/0023448 A1 | | 1/2013 | Glasscott et al. |
| 2013/0134098 A1 | | 5/2013 | Kostedt et al. |
| 2013/0168097 A1 | | 7/2013 | Janssen et al. |
| 2013/0216833 A1 | | 8/2013 | Logli et al. |
| 2014/0131288 A1 | | 5/2014 | Gu et al. |
| 2015/0217288 A1 | | 8/2015 | Hutter et al. |

FOREIGN PATENT DOCUMENTS

| | | |
|---|---|---|
| CN | 102531116 | 7/2012 |
| CN | 102675537 A | 9/2012 |
| CN | 103084147 A | 5/2013 |
| DE | 4307262 A1 | 9/1994 |
| DE | 10160664 A1 | 6/2003 |
| DE | 102009035764 A1 | 2/2011 |
| EP | 0083202 A1 | 7/1983 |
| EP | 2244268 A1 | 10/2010 |
| EP | 2339343 A1 | 6/2011 |
| EP | 2439919 A2 | 8/2011 |
| GB | 2019378 A | 10/1979 |
| GB | 1583881 A | 2/1981 |
| WO | 9707064 A1 | 2/1997 |
| WO | 2008055371 A2 | 5/2008 |
| WO | 2010062586 A2 | 6/2010 |

OTHER PUBLICATIONS

Old Oil Field Waterplood Operations and Enhanced Oil Recovery Potential, vol. 2, Chapter 12, p. 1-56, no date (Year: 0).*
Dejak, The Next Generation Water Filter for the Oil and Gas Industry, Young Technology Showcase, Oct. 2013 (Year: 2013).*
Igunna et al., Produced Water Treatment Technologies, Apr. 30, 2012 (Year: 2012).*
Office Action for Danish Application No. PA 2013 70542, Completed May 15, 2014.
International-Type Search Report for Danish Application No. PA 2013 70542, Completed Jun. 27, 2014.
International Search Report and Written Opinion for PCT/EP2014/070890, dated Jan. 12, 2015.
International Preliminary Report on Patentability for PCT/EP2014/070890, dated Apr. 5, 2016.
Bruce et al., "Synthesis, characterisation and application of silica-magnetite nanocomposites", Available online Aug. 2, 2004.
Urban et al., "Functionalized paramagnetic nanoparticles for waste water treatment", published May 25, 2010.

* cited by examiner

A. Starting point:
Nano-particles and bacteria in separate water tanks

B. Nano-particles and bacteria are mixed – bacteria are caught and immobilized!

C. Magnet attracts magnetic particles and immobilized bacteria are removed from the water phase

WATER TREATMENT SUITED FOR OIL PRODUCTION WELLS

RELATED APPLICATIONS

This application claims the benefit under 35 U.S.C. § 371 of the filing date of International Patent Application No. PCT/EP2014/070890, having an international filing date of Sep. 30, 2014, which claims priority to Danish Application No. PA 2013 70542, filed Sep. 30, 2013, the contents of International Patent Application No. PCT/EP2014/070890 are incorporated herein by reference in their entirety.

FIELD OF INVENTION

A method for the depletion of bacteria from large volumes of water using paramagnetic nanoparticles conjugated to molecules with high affinity to polysaccharides present on the extracellular surface of bacteria is described.

BACKGROUND OF THE INVENTION

Corrosion of pipelines is a major concern for the oil industry. Over the past two decades, it has become clear that corrosion in water injection pipelines is to a large extent caused by $H_2S$-producing bacteria; this phenomenon is commonly referred to as microbially-induced corrosion (MIC). The bacteria responsible for corrosion belong to a group of sulphate-reducing bacteria (SRB), which are active under anaerobic conditions.

SRB's can be found in almost all natural environments such as soils, fresh and marine waters, hot springs, geothermal areas, oil and gas wells, and in sewage systems. In addition to induced corrosion of surface facilities, production of $H_2S$ causes reservoir souring requiring additional safety precautions at the production side. The bacteria are sessile (they grow on surfaces) and protect themselves by forming biofilms, which cause bio-fouling if not properly removed.

In the oil industry, commercial biocides such as formaldehyde, glutaraldehyde or tetrakishydroxymethyl phosphonium sulphate (THPS) are or have been used in water injection pipelines to inhibit growth of microorganisms. These chemicals are typically expensive, can be dangerous to handle, may have a negative impact on the environment and are only partially efficient in controlling bacterial growth in biofilms.

Treatment of drinking water with ultraviolet (UV) light is a method, which has been in use since 1955. The bacteria will absorb UV light within a certain range of wavelengths, which will cause their DNA to undergo physical changes preventing further cell replication. The water has to be clear without any suspended solids for this mechanism to have any effect. Furthermore, this technology has not been deployed on a continuous basis.

Other methods include removal of sulphate from the injected seawater to deprive the SRB from their nutrient.

Another way to combat $H_2S$ production is to add nitrate to the injected seawater to stimulate a competing group of nitrate-reducing bacteria in the reservoir that produce nitrite. Nitrite will then inhibit SRB functionality leading to reduced production of $H_2S$. One problem of this solution is that other nitrite-reducing bacteria can counteract this inhibition by reducing nitrite to ammonia resulting in minimized nitrite-induced inhibition of SRBs.

U.S. Pat. No. 7,169,618 describes separation of cells from a medium using magnetic particles comprising a coupling molecule to capture the cell. The coupling molecule may be one of the members of a specific binding pair, e.g. antigen/antibody; enzyme/substrate; metal ion/chelate and so forth. The separation described in U.S. Pat. No. 7,169,618 is useful for analytical, preparative diagnostic or therapeutic techniques.

Inhibiting the growth of bacteria, particularly SRB's and other $H_2S$-producing bacteria remains a matter of importance for the oil industry and is of significant financial importance to the oil and related industries.

SUMMARY OF THE INVENTION

The invention is generally directed to a method of depleting the bacterial content in a water source for a water flooding process. The invention relates to a method of treating an oil well, more specifically to a method for recovering crude oil from a subsurface oil reservoir by water flooding, said methods using water depleted in bacterial content.

One aspect of the invention is directed to a method for recovering crude oil from a hydrocarbon-bearing reservoir by water flooding, the method comprises the following 5 steps:
(i) Providing a water source;
(ii) Capturing bacteria from the water source by contacting the water source with a superparamagnetic or paramagnetic particle capable of binding to bacteria present in the water source providing a capturing mixture;
(iii) Removing the bacteria bound to the superparamagnetic or paramagnetic particles from the capturing mixture by applying a magnetic field providing a depleted water;
(iv) Pumping the depleted water into one or more connecting injection well(s) in an oil field pushing the crude oil towards one or more production well(s), optionally the depleted water might be pumped to a storage volume before being pumped to the injection well(s);
(iv) Recovering crude oil from the one or more production well(s).

According to any embodiment of the first aspect, at least a portion of the bacteria of the captured bacteria are sulphate-reducing bacteria.

According to any embodiment of the first aspect, the superparamagnetic or paramagnetic particle is capable of binding the bacteria present in the water source by non-specific binding or by specific binding.

According to any embodiment of the first aspect, the superparamagnetic or paramagnetic particles are functionalized with a moiety capable of non-specifically or specifically binding the bacteria present in the water source.

According to any embodiment of the first aspect, the particle is selected from the group consisting of a particle functionalized by conjugation with a polysaccharide-binding molecule, a nanoparticle or a nanoparticle conjugated with a polysaccharide-binding molecule thereof.

According to any embodiment of the first aspect, the diameter of superparamagnetic or paramagnetic particles might be between 1 nm-10 μm, normally the superparamagnetic or paramagnetic particles will be superparamagnetic particles of size in the range of 1-1000 nm or alternatively in the range of 1-500 nm, such as in the range of 1-300 nm, or in the range of 5-300 nm, such as in the range of 5-200 nm, or 5-150 nm.

According to any embodiment of the first aspect, the superparamagnetic or paramagnetic particles are at least partially coated with an organic compound or an inorganic compound.

According to any embodiment of the first aspect, the superparamagnetic or paramagnetic particles are at least partially coated with a polymer or copolymer comprising a polysaccharide, an alginate, a chitosan, a PEG, a dextran or a polyethyleneamine.

According to any embodiment of the first aspect, the superparamagnetic or paramagnetic particles are iron or iron oxide particles with an average diameter of less than 50 nm, such as less than 20 nm, such as less than 10 nm.

According to any embodiment of the first aspect, the superparamagnetic or paramagnetic particles are coated with silica.

According to any embodiment of the first aspect where the superparamagnetic or paramagnetic particles are at least partially coated with an organic or an inorganic compound, the superparamagnetic or paramagnetic particles are at least partially coated with polyethylene glycol or a co-polymer comprising polyethylene glycol.

According to any embodiment of the first aspect, the water source is selected from seawater, water from an estuary, brackish water, or from any untreated water source having a salinity above 0.05% i.e. above 500 ppm.

According to any embodiment of the first aspect, the water in the capturing in step (ii) and/or the removing in step (iii) has a temperature in the range 4-60° C., preferably in the range of 4-40° C. and/or has a pressure in the range 1-200 atm.

According to any embodiment of the first aspect, the method of the invention comprises or constitutes a continuous process of providing water depleted in the bacterial content.

According to any embodiment of the first aspect, the weight of superparamagnetic or paramagnetic particle capable of binding the bacteria present in the water of step ii) does not exceed 0.5 kg per 1.000 kg water i.e. 0.05 wt % independent of the size of the particle.

According to any embodiment of the first aspect, the weight of superparamagnetic or paramagnetic particle capable of binding the bacteria present in the water source is at least 250 kg water/cm$^2$ particles. For particles having a radius=50 μm this corresponds to a weight percent of 0.000000004 wt %.

A further aspect of the invention is directed to a system for recovering of crude oil which system comprises a water treatment plant, one or more injection well(s) and one or more oil production well(s). The system comprises or is constituted by the following units:
a water treatment plant comprises at least two regions, a reaction region where superparamagnetic or paramagnetic particles bind to bacteria and a holding region holding ready-to-bind superparamagnetic or paramagnetic particles,
the reaction region is connected to the holding region) allowing addition of superparamagnetic or paramagnetic particles to the reaction region, the reaction region further has an inlet for untreated water, an outlet for treated water and is provided with means for mixing and means for applying a magnetic field,
the reaction tank outlet for treated water is connected with the one or more injection well(s) which injection wells are further connected to the one or more oil production well(s).

Each "region" may be constituted by a single tank provided with rigid walls of plastic or metal, or it may be constituted of a several tanks or tubes with rigid walls of metal or plastic. Each region can hold a liquid and allows for liquid being transferred to and from the region.

According to any embodiment of the further aspect, the reaction region is provided with rigid walls of non-metallic material such as plastic.

According to any embodiment of the further aspect, the water treatment plant comprises a third region in form of one or more storage compartments where the reaction tank outlet for treated water is connected to one or more storage compartments which storing compartments are then connected with the injection well(s).

According to any embodiment of the further aspect, the water treatment plant further comprises a separation region where superparamagnetic or paramagnetic particles are regenerated from the mixture of superparamagnetic or paramagnetic particles bonded to bacteria.

According to any embodiment of the further aspect, the one or more storage compartments of the third region is dimensioned to hold at least the amount to be used in the injection well(s) during the residence time of the reaction region.

According to any embodiment of the further aspect, the water treatment plant is placed onshore whereas the oil production well and injection wells are placed offshore.

Yet a further aspect of the invention is directed use of water depleted in bacteria for recovering oil by water flooding, wherein the depletion of the bacteria from water is performed by capturing at least a portion of the bacteria from a water source by contacting the water source with superparamagnetic or paramagnetic particles capable of binding the bacteria present in the water source providing a capturing mixture followed by removing the bacteria bound to the superparamagnetic or paramagnetic particles from the capturing mixture by applying a magnetic field providing a water reduced bacterial content.

According to any embodiment of this yet further aspect, the superparamagnetic or paramagnetic particles are functionalized with a moiety capable of specifically binding bacteria present in the water source.

Figure 1:
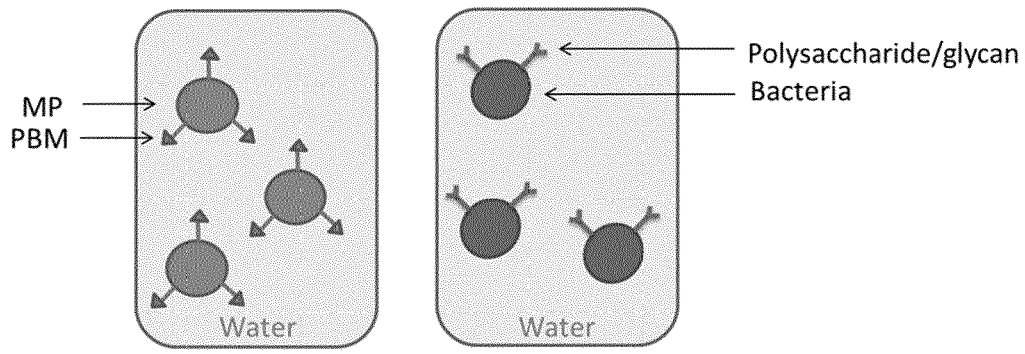
FIG. 1: Illustrates the basic process
A. Starting point: Microparticles (MP) or nanoparticles functionalized with a polysaccharide binding molecule (PBM) are in one recipient. In another recipient, the water source comprising bacteria is found, said bacteria naturally comprising polysaccharides on their cell surfaces.
B. Immobilization: The microparticles (MP) or nanoparticles are mixed with the bacteria. Bacteria are caught by the PBM by means of a PBM-cell surface polysaccharide interaction, and immobilized to the particles.
C. Magnetization: A magnetic field is applied to the mixture and the now magnetized particles are removed from the water phase.
Figure 1:
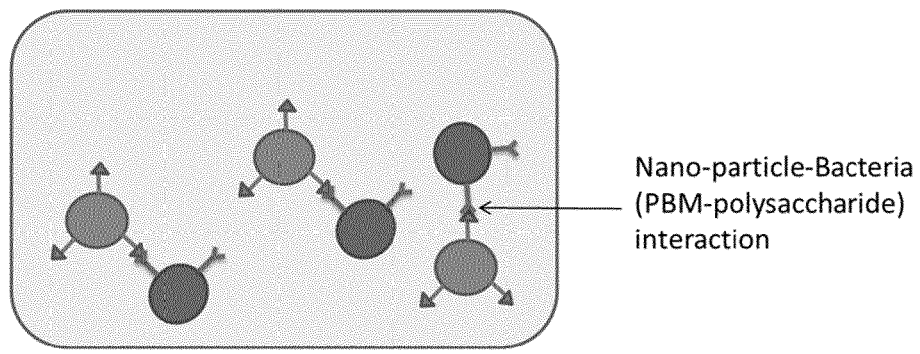
Figure 1:
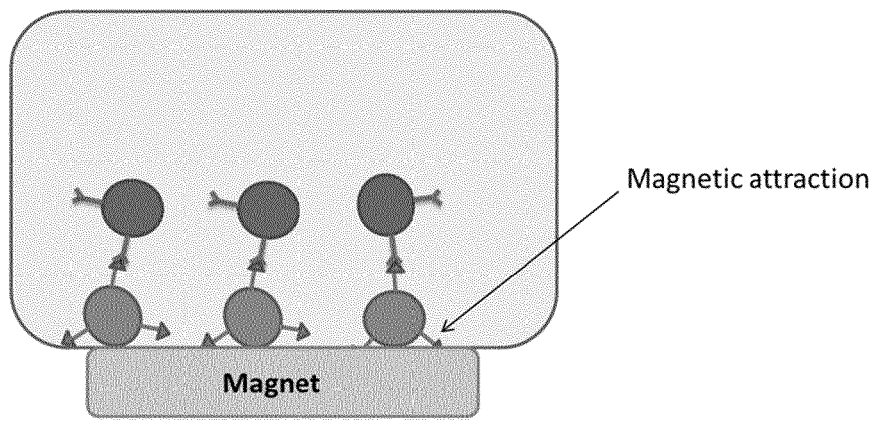
Figure 2:
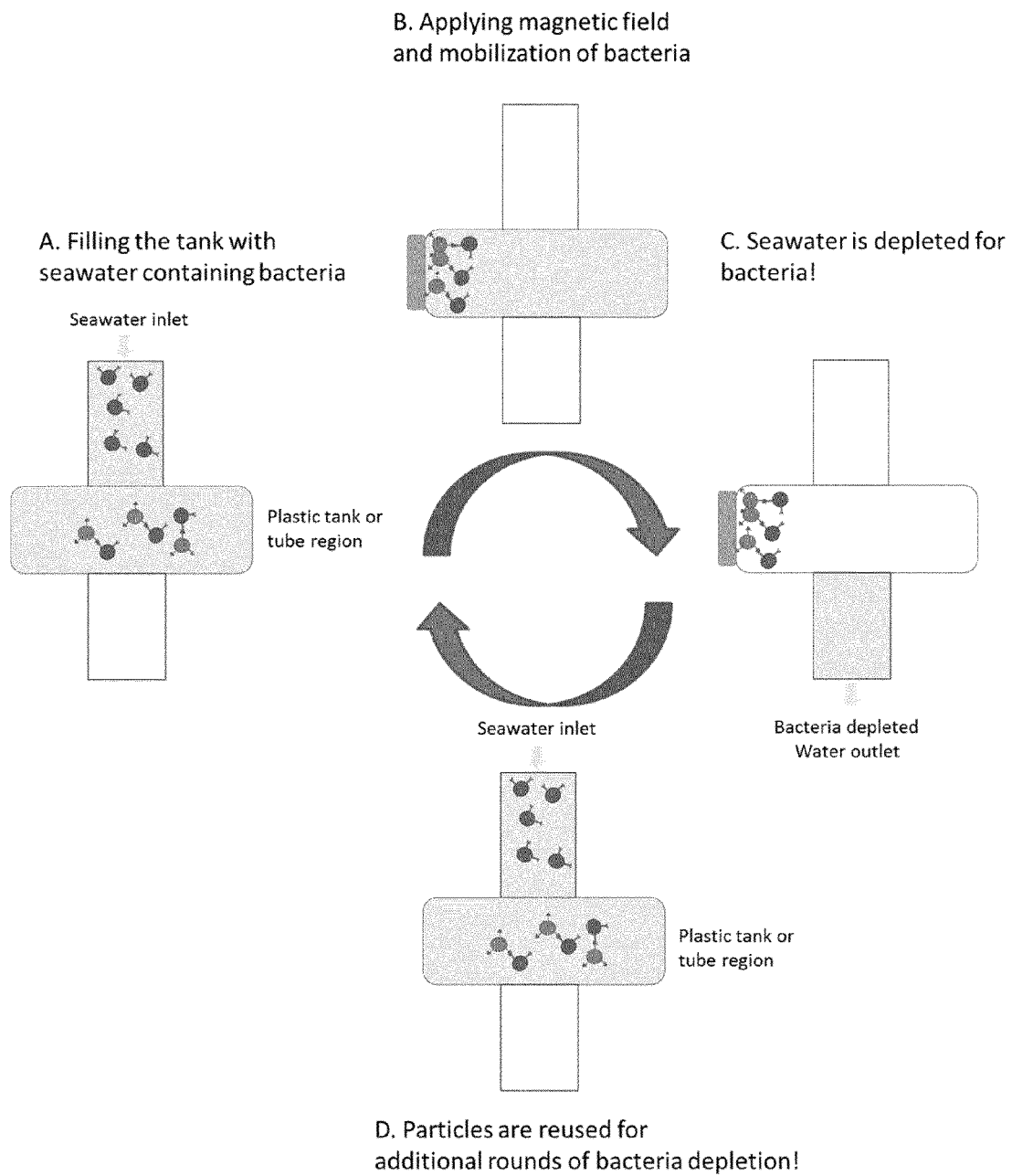
FIG. 2: Illustrates a continuous process including reuse of the particles
A. Seawater enters a metallic tube (conventional). A tank is toploaded with bacteria-containing seawater. A central tank comprises (super)paramagnetic particles.
B. Seawater enters a tank made of non-magnetic and non-magnetisable material such as plastic or a tube-region made of non-magnetic material and non-magnetisable where PBM-MPs are present. (The contents of the two tanks are mixed and the bacteria are immobilized onto the particles). Time is allowed for mixing and equilibration. A magnetic field is applied on the tank made of non-magnetic and non-magnetisable material such as plastic—and the particles are pulled towards the magnet.

C. The seawater is depleted of bacteria and the depleted water is sent to down-stream tubes and ready for injection.
D. The trapped particles are removed (with caught bacteria) to another compartment.
  i: Bacteria are released via mild elution as described above;
  ii: Bacteria are killed or collected;
  iii: PBM-MP particles are re-suspended after elution and removal of external magnetic field and can now be re-used.

Particles are used for additional rounds of bacterial depletion.

DETAILED DESCRIPTION OF THE INVENTION

The invention is generally directed to a method of depleting the bacterial content in a water source, such as for a water flooding process. The invention relates to a method of treating an oil well, more specifically to a method for recovering crude oil from the ground by water flooding, said methods using water depleted in bacterial content.

The method of the invention is applicable to oil recovery, natural gas recovery, treatment of water wells, and for treatment of hydraulic fluids for fracturing processes.

The invention is directed to a method depleting the bacterial content in a water source, such as for a water flooding process, said method comprising the steps of
  a. Contacting the water source with a superparamagnetic or paramagnetic particle;
  b. Complexing at least a portion of the bacterial content with the particle so as to form a bacteria-particle complex;
  c. Removing the bacteria-particle complex by applying a magnetic field so as to provide a water source with depleted bacterial content.

The particles are paramagnetic in nature in that they are attracted to a magnet when placed in a magnetic field but retain no magnetic memory upon removal of the magnetic field. This characteristic prevents aggregation and allows for easy dispersion of the particles. Paramagnetic materials include most chemical elements and some compounds, they have a relative magnetic permeability greater or equal to 1 (i.e., a positive magnetic susceptibility) and hence are attracted to magnetic fields. The particles are of a chemical nature so as to have paramagnetic properties. The paramagnetism of the particle may be achieved by any number of elements or compounds. The particle may be superparamagnetic or paramagnetic due to the use of an organic superparamagnetic or paramagnetic compound, a metallic superparamagnetic or paramagnetic compound or an organometallic superparamagnetic or paramagnetic compound.

The superparamagnetism or paramagnetism of the particle may be due to the particles comprising an element selected from the group consisting of lithium, oxygen, sodium, magnesium, aluminum, calcium, titanium, manganese, iron, cobalt, nickel, strontium, zirconium, molybdenum, ruthenium, rhodium, palladium, tin, barium, cerium, neodymium, samarium, europium, gadolinium, terbium, dysprosium, holmium, erbium, thulium, osmium, tungsten, tungsten iridium, tungsten and platinum. Strong paramagnetism is exhibited by compounds containing iron, palladium, platinum, and the rare-earth elements. Accordingly, the particles preferably comprise an element selected from the group consisting of iron, palladium, platinum, and the rare-earth elements.

The particles may comprise a superparamagnetic or paramagnetic core, optionally coated with an inorganic or organic compound; or may comprise a composite core of a paramagnetic and a non-paramagnetic compound. Polymers are suitable non-paramagnetic compounds. Examples of polymers for use in a composite core include styrenic polymers or copolymers, (meth)acrylate polymers or copolymers, or a highly conjugated aromatic polymer.

The particle may be selected from the group consisting of a particle functionalized by conjugation with a polysaccharide-binding molecule, a nanoparticle, or a nanoparticle conjugated with a polysaccharide-binding molecule thereof. Accordingly, one of three types of particles is anticipated for use in complexing to the bacteria in the water source.

The particles are superparamagnetic or paramagnetic particles and may bind the bacteria either by virtue of their small size or by means of the polysaccharide-binding molecule, or a combination thereof.

The superparamagnetic or paramagnetic particles may comprise or at least partially comprise a coating of an organic compound or an inorganic compound. In the embodiment wherein the superparamagnetic or paramagnetic particles are at least partially coated with an inorganic compound, the inorganic compound may suitably be selected from silica.

The nanoparticles may be functionalized via the coating to include a functionality for adjusting surface properties and blendability of the nanoparticles. In an embodiment, functional groups include carboxy (e.g., carboxylic acid groups), epoxy, ether, ketone, amine, hydroxy, alkoxy, alkyl, aryl, aralkyl, alkaryl, lactone, functionalized polymeric or oligomeric groups, ionic groups such as ammonium groups and/or carboxylate salt groups, or a combination comprising at least one of the forgoing functional groups.

In another embodiment, the nanoparticle composition is further derivatized by grafting certain polymer chains to the functional groups. For example, polymer chains such as acrylic chains having carboxylic acid functional groups, hydroxy functional groups, and/or amine functional groups; polyamines such as polyethyleneamine or polyethyleneimine; and poly(alkylene glycols) such as poly(ethylene glycol) and poly(propylene glycol), may be included by reaction with functional groups.

In the embodiment wherein the superparamagnetic or paramagnetic particles are at least partially coated with an organic compound, the organic compound may be selected from a polymer or copolymer comprising for instance a polysaccharide, an alginate, a chitosan, a PEG, a dextran or a polyethyleneamine.

The particles may be prepared by coating a layer of magnetite and polystyrene onto monodispersed (i.e. uniform sized) polystyrene core particles. The magnetite content of these magnetic particles can be adjusted but typically represents about 10% to 15% for 1 micron particles. The magnetic particles can be easily separated from a suspension magnetically. These particles become non-magnetic when removed from a magnet, and do not retain any detectable magnetism even after repeated exposure to strong magnetic field.

Examples of dextran-based spherical beads include Kisker-Biotech® dextran-based nanoparticles in the size range of 20-100 nm); Nanomag®-D, made of dextran polymers of size 130 nm; and MagCellect® particles of size 150 nm.

Superparamagnetic particles made by other types of polymers or inorganic material may be used as well. One particular advantage of using such small particles is that the size, physical properties, chemical reactivity and conjugation possibilities is flexible and can be tailor-made.

Suitably, the particles comprise a superparamagnetic or paramagnetic core, such as a magnetite core, coated, or at least partially coated in silica or a silicate, or a $(SiO_2)$-magnetite $(Fe_3O_4)$ composite. As an example, the superparamagnetic or paramagnetic particle, such as a nanoparticle or microparticle, may be coated or partially coated with tetraethyl ortho silicate, $Si(OC_2H_5)_4$ or TEOS.

In one embodiment, the particle is a nanoparticle without any conjugated polysaccharide-binding molecule (PBM) (i.e. non-functionalized) where bacterial polysaccharide adsorption would occur solely with surface energy as driving force. For very small nanoparticles surface energy will be large due to the high area-to-volume ratio and due to quantum confinement effects (i.e. the size is less than the wavelength of electrons (de Broglie wavelength) leading to the bypassing of periodic quantum mechanical boundary conditions). Surface energy and driving forces can be tuned, for instance by the size or the selection of the polymer material.

In a further embodiment, particles are at least partially functionalized with a conjugated polysaccharide-binding molecule (PBM). Under this embodiment, the size of the particles may be larger than the non-functionalized particles. Accordingly, the diameter of superparamagnetic or paramagnetic particles may be between 1 to 1000 nm, depending on whether they are non-functionalized or at least partially functionalized with a polysaccharide-binding molecule. Typically, the particles are superparamagnetic particles of size in the range of 1 to 1000 nm, more preferably 1 to 600 nm.

In one embodiment, the particles are microparticles or nanoparticles of superparamagnetic or paramagnetic cores, at least partially functionalized with a conjugated polysaccharide-binding molecule (PBM).

Preferably, the diameter of superparamagnetic or paramagnetic particles are in the range of 1 to 500 nm, such as in the range of 1 to 300 nm, preferably in the range of 5 to 300 nm, such as in the range of 5 to 200 nm, typically 5 to 150 nm.

Particles may be of the nanometer size of less than 150 nm since particles of this diameter have a high area-to-volume ratio leading to a high PBM-conjugation capacity. Suitably, the particles may be dextran-based spherical beads.

In a further suitable embodiment, the particle has a diameter of less than 25 nm, such as less than 20 nm, and is made of iron or iron oxide ($Fe_3O_4$, magnetite). These particles have the advantage of very low sedimentation rates and do not plug micrometer scale pores.

The superparamagnetic or paramagnetic particle may bind the bacteria present in the water source by non-specific binding or by specific binding. Accordingly, the superparamagnetic or paramagnetic particle is capable of binding the bacteria present in the water source by non-specific binding or by specific binding. The superparamagnetic or paramagnetic particles may be functionalized with a moiety capable of non-specifically binding the bacteria present in the water source. Alternatively, the superparamagnetic or paramagnetic particles are functionalized with a moiety capable of specifically binding the bacteria present in the water source.

It is well-known that the cell surface of bacteria is covered with polysaccharides (sugar polymers) conjugated to lipids and proteins. These molecular components make the surface facing the extracellular phase hydrophilic mediating interactions between the bacteria and other bacteria or organisms, and are involved in biofilm formation. One aspect of the invention relates to a specific or non-specific complexation of the bacterial polysaccharides and a polysaccharide-binding molecule (PBM) of the particle.

The polysaccharide-binding molecule could be any kind of polysaccharide binding molecule, preferably cheap, with very high affinity and unselective towards sugar motifs of glycolipids and glycans. Concrete PBMs could be lectins (proteins), such as *Sclerotium rolfsii* lectin (SRL), *Aleuria Aurantia* Lectin (ALL), Jacalin, *Pseudomonas* lectin H (PA-IIL), concanavalin A (ConA), wheat germ lectin (WGL) etc. which can be derived from plants, bacteria and fungi. Production can easily be made in large (industrial) scale via gene cloning techniques and appropriate engineering of plasmids to be transferred into e.g. bacteria. The polysaccharide-binding molecule is not limited or restricted to antibodies or proteins but could just as well be selected from organic or inorganic molecules capable of binding polysaccharides.

The polysaccharide-binding molecule may be an organic or inorganic compound or a combination thereof. Suitable embodiments of organic polysaccharide-binding molecule may be selected from the group consisting of a protein, including an antibody, a peptide of 2-200 amino acids, an amino acid, a polysaccharide, a sugar, a nucleotide or nucleoside including DNA or RNA, a $C_1$-$C_{30}$ alkyl, a $C_1$-$C_{30}$ alkenyl, a $C_1$-$C_{30}$ alkylyl, a $C_1$-$C_{30}$ ether, a $C_1$-$C_{30}$ amine, a $C_1$-$C_{30}$ ester, a $C_1$-$C_{30}$ amide, and combinations thereof.

In an important embodiment of the present invention, a polysaccharide-binding molecule (PBM) is conjugated to a superparamagnetic or paramagnetic particle. The polysaccharide-binding molecule may be selected from a polymer or copolymer comprising for instance a polysaccharide, an alginate, a chitosan, a PEG, a dextran or a polyethyleneamine.

The polysaccharide-binding molecule may be an inorganic compound, optionally modified with an organic compound. The inorganic compound, such as silica, may be optionally modified with an organic compound, such as an organic compound selected from the group consisting of a protein, including an antibody, a peptide of 2-200 amino acids, an amino acid, a polysaccharide, a sugar, a nucleotide or nucleoside including DNA or RNA, a $C_1$-$C_{30}$ alkyl, a $C_1$-$C_{30}$ alkenyl, a $C_1$-$C_{30}$ alkylyl, a $C_1$-$C_{30}$ ether, a $C_1$-$C_{30}$ amine, a $C_1$-$C_{30}$ ester, a $C_1$-$C_{30}$ amide, and combinations thereof.

In a suitable embodiment, the inorganic polysaccharide-binding molecule is tetraethyl ortho silicate, $Si(OC_2H_5)_4$ or TEOS, which has been shown to bind to bacteria due to its high hydrophilicity.

In a combination of suitable embodiments, the particles may be iron or iron oxide particles with an average diameter of less than 50 nm, such as less than 20 nm, such as less than 10 nm, and may further be at least partially coated with polyethylene glycol or a co-polymer comprising polyethylene glycol.

In a further combination of suitable embodiment, the particle is a superparamagnetic iron oxide particle, optionally coated, or at least partially coated, with silica. The silica coat encapsulates the superparamagnetic iron oxide particles and makes the particles become very hydrophilic. Typically, the size of such coated or partially coated iron oxide particles is in the range of 5 to 50 nm, typically 5 to 20 nm. Such nanoparticles can be easily synthesized or bought commercially. One advantage of using very small silica coated particles is that these are membranolytic, in that they disrupt membrane integrity, to cells themselves.

The silica coated or partially silica coated iron oxide particles may optionally further comprise a polymer or co-polymer coating to serve as a polysaccharide-binding molecule. The polymer or co-polymer coating may be added in selected proportions so as to tune the binding properties of the at least partially silica coated particle. In a typical embodiment, PEG may be used to coat the at least partially silica coated particle.

As stated, an aspect of the invention relates to a method of treating an oil well, the method comprising the steps of
(i) Providing a water source;
(ii) Capturing bacteria from the water source by contacting the water source with a superparamagnetic or paramagnetic particle capable of binding to bacteria present in the water source providing a capturing mixture;
(iii) Removing the bacteria bound to the superparamagnetic or paramagnetic particles from the capturing mixture by applying a magnetic field providing a depleted water;
(iv) Pumping the depleted water into one or more connecting injection well(s) in an oil field pushing the crude oil towards one or more production well(s);
(v) Recovering the crude oil from the one or more production well(s).

A magnetisable particle becomes magnetic when a magnetic field is present, and becomes non-magnetic when the field is removed. According to the present invention, particles, such as those functionalized with polysaccharide-binding molecule (PBM), are added to a water source, such as the seawater, preferably at an injection point upstream the pumps. The particles should not be permanently magnetic since such particles would aggregate and precipitate. When the particles are added, the polysaccharides of the bacteria membrane surface will bind to the PBM-part, specifically or non-specifically and typically with high affinity, and thus catch the bacteria and immobilize them, thereby forming a bacteria-particle complex. Due to the large area-to-volume ratio of the particles, the particles will have a large bacteria-storage/catching capacity.

The bacteria-particle complexes may be then subsequently isolated from the water by applying a magnetic field that magnetizes the particles causing them to migrate towards the magnet. This procedure takes place in a non-metallic environment (such as plastic tanks). The particles are then removed and the bacteria are released by mild elution with high concentration of sugar, by means of competitive elution, or low concentration of salt, by means of electrostatic shielding. In embodiments wherein the particles do not comprise a PBMs or not comprising antibodies, harder elution can be used (although antibodies are often stable in a large pH-salinity window). Bacteria can then be killed, via osmosis, electrolyte addition, antibiotics, or isolated (if it is of interest to make enrichment cultures or research experiments) or discharged back to the sea or otherwise discarded.

An advantage of this method is that in at least conditions of mild elution, the particles may be recovered, re-suspended and reused again for another round of treatment of a water source.

The water source may be a water source used in these types of processes and is a non-limiting aspect of the invention. Suitably, the water source is selected from seawater, water from an estuary, brackish water, water having a salinity above 0.05% (such as above 15 ppt) and untreated water. In the water treatment processes currently envisaged such as for oil or gas recovery, the water source is typically sea water. The water source may also in any form of untreated or pre-treated water, e.g. treated by reverse osmosis, nano-filtration, vapour distillation, or freezing desalination.

Typically, depending on the nature of the water source, the water source has a salinity of less than 250.000 ppm. The water source may have a mineral content, typically a mineral content of less than 7.000 ppm.

In some aspects of the invention, the process of the invention involves capturing bacteria from the water source by contacting the water source with a superparamagnetic or paramagnetic particle capable of binding to bacteria present in the water source providing a capturing mixture; and furthermore removing the bacteria bound to the superparamagnetic or paramagnetic particles from the capturing mixture by applying a magnetic field providing a depleted water. In other aspects of the invention, the process involves contacting steps, complexing steps, and removing steps. The water source in the any one or more of the capturing step, the removing step, the contacting step, and the complexing step may have a temperature in the range 4-60° C., preferably in the range of 4-40° C. The pressure may be in the range 1-200 atm.

An object of the invention is the depletion or substantial depletion of bacteria from a water source. Subsequent to the depletion process, the depleted water is typically used for its intended purpose, including in an oil recovery process, for recovering crude oil from a subsurface oil reservoir by water flooding. The water flooding may be a continuous process of providing water depleted in the bacterial content. The depleted water is depleted in the sense that it has been depleted in at least one type of bacteria. Preferably, the depleted water source is at least partially depleted in sulphate-reducing bacteria content. Accordingly, at least a portion of the bacteria of the bacteria-particle complex are sulphate-reducing bacteria.

The method of invention is suitable for bacteria in general. Typically, the bacteria are anaerobic bacteria. Given the impact on the oil production industry, the bacteria are preferably sulphate reducing bacteria or sulphur reducing bacteria, more preferably sulphate reducing bacteria. The organisms that can do this represent an extremely wide group whose majority falls within the delta Proteobacteria.

Depending on the prevalence of the bacteria in the water (the concentration of bacteria in the water source) and the size and functionalization of the particle, the amount of particle used will vary. The weight of superparamagnetic or paramagnetic particle capable of binding the bacteria present in the water source typically will not exceed 0.5 kg per 1.000 kg water (i.e. 0.5 wt %) independent of the size of the particle. wherein the weight of superparamagnetic or paramagnetic particle capable of binding the bacteria present in the water source does not exceed 0.5 kg per 1.000 kg water (i.e. 0.5 wt %) 250 kg water/cm$^2$ particles independent of the size of the particle, e.g. at least 500 kg water/cm$^2$ particles independent of the size of the particle, such as at least 750 kg water/cm$^2$ particles independent of the size of the particle, e.g. at least 1.000 kg water/cm$^2$ particles independent of the size of the particle, such as at least 2.500 kg water/cm$^2$ particles independent of the size of the particle, e.g. at least 5.000 kg water/cm$^2$ particles independent of the size of the particle, such as at least 7.500 kg water/cm$^2$ particles independent of the size of the particle, e.g. at least 10.000 kg water/cm$^2$ particles independent of the size of the particle, such as at least 15.000 kg water/cm$^2$ particles independent of the size of the particle.

According to the process of the invention the water source and the superparamagnetic or paramagnetic particles are typically contacted in a first water tank, wherein the first water tank is made of a non-magnetisable or non-magnetic material such as plastic. After the capturing of the bacteria from the water source by contacting the water source with a superparamagnetic or paramagnetic particle and removing the bacteria bound to the superparamagnetic or paramagnetic particles from the capturing mixture by applying a magnetic field so as to provide a depleted water, the depleted water is typically stored in a second water tank.

The invention is furthermore directed to a composition comprising water and a bacteria-particle complex, particularly seawater. The invention is furthermore directed to seawater depleted in its bacterial content obtainable by the method of the invention.

A further aspect of the invention is directed to a system comprising an oil production plant connected to at least one production well and a water purification plant connected to at least one injection well, wherein the water purification plant comprises at least one inlet, at least one capturing site, at least one bacteria removing site and at least one outlet, said at least one capturing site comprises superparamagnetic or paramagnetic particles capable of binding bacteria present in the water source and wherein the at least one removing site comprises a non-magnetisable material and means for applying a magnetic field wherein the outlet from the water purification plant is connected to the at least one injection well. The particles and process of the system are as defined above.

Another aspect of the invention relates to the use of water depleted in bacteria for recovering oil by water flooding, wherein the depletion of the bacteria from water is performed by capturing at least a portion of the bacteria from a water source by contacting the water source with superparamagnetic or paramagnetic particles capable of binding the bacteria present in the water source providing a capturing mixture followed by removing the bacteria bound to the superparamagnetic or paramagnetic particles from the capturing mixture by applying a magnetic field providing a water reduced bacterial content.

The process of the invention may be a continuous process or a batch-wise process, depending on the conditions of the installation in place.

According to one aspect the invention relates to a method of treating water to be injected into an oil well, the method comprising the steps of
(i) Providing a water source;
(ii) Capturing bacteria from the water source by contacting the water source with a superparamagnetic or paramagnetic particle capable of binding to bacteria present in the water source providing a capturing mixture;
(iii) Removing the bacteria bound to the superparamagnetic or paramagnetic particles from the capturing mixture by applying a magnetic field providing a depleted water;
(iv) Pumping the depleted water into one or more connecting injection well(s) in an oil field pushing the crude oil towards one or more production well(s);
(v) Recovering the crude oil from the one or more production well(s).

According to a second aspect the invention relates to a method for recovering crude oil from a hydrocarbon-bearing reservoir by water flooding, the method comprising the steps of:
(i) Providing a water source;
(ii) Capturing bacteria from the water source by contacting the water source with a superparamagnetic or paramagnetic particle capable of binding to bacteria present in the water source providing a capturing mixture;
(iii) Removing the bacteria bound to the superparamagnetic or paramagnetic particles from the capturing mixture by applying a magnetic field providing a depleted water;
(iv) Pumping the depleted water into one or more connecting injection well(s) in an oil field pushing the crude oil towards one or more production well(s);
(v) Recovering the crude oil from the one or more production well(s).

According to a third aspect the invention relates to a method of depleting the bacterial content in a water source for a water flooding process, said method comprising the steps of
a. Contacting the water source with a superparamagnetic or paramagnetic particle;
b. Complexing at least a portion of the bacterial content with the particle so as to form a bacteria-particle complex;
c. Removing the bacteria-particle complex by applying a magnetic field so as to provide a water source with depleted bacterial content.

According to an embodiment of each of the above aspects, the superparamagnetic or paramagnetic particle is capable of binding bacteria present in the water source by non-specific binding or by specific binding.

According to an embodiment of each of the above aspects or embodiments, the superparamagnetic or paramagnetic particles are functionalized with a moiety capable of non-specifically binding the bacteria present in the water source.

According to an embodiment of each of the above aspects or embodiments, the superparamagnetic or paramagnetic particles are functionalized with a moiety capable of specifically binding the bacteria present in the water source.

According to an embodiment of each of the above aspects or embodiments, the particle is selected from the group consisting of a particle functionalized by conjugation with a polysaccharide-binding molecule, a nanoparticle or a nanoparticle conjugated with a polysaccharide-binding molecule thereof.

According to an embodiment of each of the above aspects or embodiments, the diameter of superparamagnetic or paramagnetic particles are between 1 nm-10 μm, preferably the superparamagnetic or paramagnetic particles are superparamagnetic particles of size in the range of 1-1000 nm, more preferably 1-600 nm.

According to an embodiment of each of the above aspects or embodiments, the diameter of superparamagnetic or paramagnetic particles are in the range of 1-500 nm, such as in the range of 1-300 nm, preferably in the range of 5-300 nm, such as in the range of 5-200 nm, typically 5-150 nm.

According to an embodiment of each of the above aspects or embodiments, the superparamagnetic or paramagnetic particles are at least partially coated with an organic compound or an inorganic compound. The particles are at least partially coated with polyethylene glycol or a co-polymer comprising polyethylene glycol.

According to an embodiment of each of the above aspects or embodiments, the superparamagnetic or paramagnetic particles are at least partially coated with a polymer or copolymer comprising a polysaccharide, an alginate, a chitosan, a PEG, a dextran or a polyethyleneamine.

According to an embodiment of each of the above aspects or embodiments, the particles are iron or iron oxide particles with an average diameter of less than 50 nm, such as less than 20 nm, such as less than 10 nm.

According to an embodiment of each of the above aspects or embodiments, the particles are coated with silica.

the particles are at least partially coated with polyethylene glycol or a co-polymer comprising polyethylene glycol. the water source is selected from seawater, and water from an estuary, brackish water, water having a salinity above 0.05% (above 15 ppt), and an untreated water source.

According to an embodiment of each of the above aspects or embodiments, the water source is sea water.

According to an embodiment of each of the above aspects or embodiments, the water source is in any form of untreated or pre-treated water, e.g. treated by reverse osmosis, nano-filtration, vapour distillation, or freezing desalination.

According to an embodiment of each of the above aspects or embodiments, the water source has a salinity of less than 250.000 ppm.

According to an embodiment of each of the above aspects or embodiments, the water source has a mineral content of less than 7.000 ppm.

According to an embodiment of each of the above aspects or embodiments, the water source in the capturing in step (ii) and/or the removing in step (iii) has a temperature in the range 4-60° C., preferably in the range of 4-40° C. and/or has a pressure in the range 1-200 atm.

According to an embodiment of each of the above aspects or embodiments, the method comprises a continuous process of providing water depleted in the bacterial content.

According to an embodiment of each of the above aspects or embodiments, the depleted water has been depleted in at least one type of bacteria.

According to an embodiment of each of the above aspects or embodiments, at least a portion of the bacteria of the bacteria-particle complex are sulphate-reducing bacteria.

According to an embodiment of each of the above aspects or embodiments, the depleted water source is at least partially depleted in sulphate-reducing bacteria content.

According to an embodiment of each of the above aspects or embodiments, the weight of superparamagnetic or paramagnetic particle capable of binding the bacteria present in the water source does not exceed 0.5 kg per 1.000 kg water (i.e. 0.5 wt %) independent of the size of the particle.

According to an embodiment of each of the above aspects or embodiments, the weight of superparamagnetic or paramagnetic particle capable of binding the bacteria present in the water source is at least 250 kg water/cm$^2$ particles.

According to an embodiment of each of the above aspects or embodiments, the water source and the superparamagnetic or paramagnetic particles are contacted in a first water tank, wherein the first water tank is made of a non-magnetisable or non-magnetic material such as plastic.

According to an embodiment of each of the above aspects or embodiments, the depleted water is stored in a second water tank.

According to a fourth aspect the invention relates to a system comprising an oil plant connected to at least one production well and a water purification plant connected to at least one injection well, wherein the water purification plant comprises at least one inlet, at least one capturing site, at least one bacteria removing site and at least one outlet, said at least one capturing site comprises superparamagnetic or paramagnetic particles capable of binding bacteria present in the water source and wherein the at least one removing site comprise a non-magnetisable material and means for applying a magnetic field wherein the outlet from the water purification plant is connected to the at least one injection well.

According to an embodiment of the fourth aspect, the diameter of superparamagnetic or paramagnetic particles is between 1 nm-10 μm, preferably the superparamagnetic or paramagnetic particles are superparamagnetic particles of size in the range of 1-1000 nm. The particle size of the particles is in the range of 1-600 nm, such as in the range of 3-500 nm, e.g. in the range of 5-300 nm, e.g. in the range of 7.5-200 nm, such as in the range of 10-100 nm, e.g. in the range of 15-50 nm.

According to any embodiment of the fourth aspect of the invention, the superparamagnetic or paramagnetic particles are coated with an organic compound or an inorganic compound.

According to any embodiment of the fourth aspect of the invention, the superparamagnetic or paramagnetic particles are coated with a polymer, such as a polysaccharide, an alginate, a chitosan, a PEG, a dextran or a polyethyleneamine.

According to any embodiment of the fourth aspect of the invention, the superparamagnetic or paramagnetic particles are functionalized with a moiety capable of specifically binding bacteria present in the water source.

According to any embodiment of the fourth aspect of the invention, the water source and the superparamagnetic or paramagnetic particles are contacted in a first water tank.

According to any embodiment of the fourth aspect of the invention, the depleted water is stored in a second water tank.

According to a fifth aspect the invention relates to use of water depleted in bacteria for recovering oil by water flooding, wherein the depletion of the bacteria from water is performed by capturing at least a portion of the bacteria from a water source by contacting the water source with superparamagnetic or paramagnetic particles capable of binding the bacteria present in the water source providing a capturing mixture followed by removing the bacteria bound to the superparamagnetic or paramagnetic particles from the capturing mixture by applying a magnetic field providing a water reduced bacterial content.

According to an embodiment of the fifth aspect of the invention, the superparamagnetic or paramagnetic particles are functionalized with a moiety capable of specifically binding bacteria present in the water source.

The invention claimed is:

1. A method for recovering crude oil from a hydrocarbon-bearing reservoir by water flooding, the method comprising the steps of:
   (i) providing a water source;
   (ii) depleting bacteria from the water source by contacting the water source with a superparamagnetic or paramagnetic particle capable of binding to bacteria present in the water source thereby providing a capturing mixture;
   (iii) removing the bacteria bound to the superparamagnetic or paramagnetic particles from the capturing mixture by applying a magnetic field thereby providing a bacteria depleted water;
   (iv) pumping the bacteria depleted water into one or more connecting injection well(s) in an oil field thereby pushing the crude oil towards one or more production well(s), the bacteria depleted water is pumped to a storage volume before being pumped to the injection well(s); and
   (v) recovering crude oil from the one or more production well(s).

2. The method according to claim 1, wherein at least a portion of the bacteria of the depleted bacteria are sulphate-reducing bacteria.

3. The method according to claim 1, wherein the superparamagnetic or paramagnetic particle is capable of binding the bacteria present in the water source by non-specific binding or by specific binding.

4. The method according to claim 1, wherein the superparamagnetic or paramagnetic particles are functionalized with a moiety capable of non-specifically or specifically binding the bacteria present in the water source.

5. The method according to claim 1, wherein the particle is selected from the group consisting of a particle functionalized by conjugation with a polysaccharide-binding molecule, a nanoparticle or a nanoparticle conjugated with a polysaccharide-binding molecule thereof.

6. The method according to claim 1, wherein the diameter of superparamagnetic or paramagnetic particles is between 1 nm and 10 μm.

7. The method according to claim 1, wherein the superparamagnetic or paramagnetic particles are at least partially coated with an organic compound or an inorganic compound.

8. The method according to claim 7, wherein the superparamagnetic or paramagnetic particles are coated with silica.

9. The method according to claim 7, wherein the superparamagnetic or paramagnetic particles are at least partially coated with polyethylene glycol or a co-polymer comprising polyethylene glycol.

10. The method according to claim 1, wherein the superparamagnetic or paramagnetic particles are at least partially coated with a polymer or copolymer comprising a polysaccharide, an alginate, a chitosan, a PEG, a dextran or a polyethyleneamine.

11. The method according to claim 1, wherein the superparamagnetic or paramagnetic particles are iron or iron oxide particles with an average diameter of less than 50 nm.

12. The method according to claim 1, wherein the water source is selected from seawater, water from an estuary, brackish water, and an untreated water source having a salinity above 0.05%.

13. The method according to claim 1, wherein the water in the depletion in step (ii) and/or the removing in step (iii) has a temperature in the range 4-60° C. and/or has a pressure in the range 1-200 atm.

14. The method according to claim 1, comprising a continuous process of providing water depleted in the bacterial content.

15. The method according to claim 1, wherein the weight of superparamagnetic or paramagnetic particle capable of binding the bacteria present in the water of step ii) does not exceed 0.5 kg per 1.000 kg water independent of the size of the particle.

16. The method according to claim 1, wherein the superparamagnetic or paramagnetic particles are superparamagnetic particles of size in the range of 1-1000 nm.

17. The method according to claim 1, wherein the superparamagnetic or paramagnetic particles are superparamagnetic particles of size in the range of 1-500 nm.

18. The method according to claim 1, wherein the superparamagnetic or paramagnetic particles are superparamagnetic particles of size in the range of 1-300 nm.

19. The method according to claim 1, wherein the superparamagnetic or paramagnetic particles are superparamagnetic particles of size in the range of 5-300 nm.

20. The method according to claim 1, wherein the superparamagnetic or paramagnetic particles are superparamagnetic particles of size in the range of 5-200 nm.

21. The method according to claim 1, wherein the superparamagnetic or paramagnetic particles are superparamagnetic particles of size in the range of 5-150 nm.

22. The method according to claim 1 wherein the superparamagnetic or paramagnetic particles are iron or iron oxide particles with an average diameter of less than 20 nm.

23. The method according to claim 1 wherein the superparamagnetic or paramagnetic particles are iron or iron oxide particles with an average diameter of less than 10 nm.

24. The method according to claim 1, wherein the water in the depletion in step (ii) and/or the removing in step (iii) has a temperature in the range 4-40° C., and/or has a pressure in the range 1-200 atm.

25. A System for recovering of crude oil comprising a water treatment plant, one or more injection well(s) and one or more oil production well(s), wherein
the water treatment plant comprises at least two regions,
a reaction region where superparamagnetic or paramagnetic particles bind to bacteria and a holding region holding ready-to-bind superparamagnetic or paramagnetic particles,
the reaction region is connected to the holding region allowing addition of superparamagnetic or paramagnetic particles to the reaction region, the reaction region further has an inlet for untreated water, an outlet for treated water and is provided with means for mixing and means for applying a magnetic field,
the reaction tank outlet for treated water is connected with the one or more injection well(s) which injection wells are further connected to the one or more oil production well(s).

26. The system according to claim 25, wherein the reaction region is provided with rigid walls of non-metallic material.

27. The system according to claim 25, wherein the water treatment plant comprises a third region in form of one or more storage compartments where the reaction tank outlet for treated water is connected to one or more storage compartments which storing compartments are then connected with the injection well(s).

28. The system according to claim 27, wherein the one or more storage compartments of the third region is dimensioned to hold at least the amount to be used in the injection well(s) during the residence time of the reaction region.

29. The system according to claim 25, wherein the water treatment plant further comprises a separation region where superparamagnetic or paramagnetic particles are regenerated from a mixture of superparamagnetic or paramagnetic particles bonded to bacteria.

30. The system according to claim 25, wherein the water treatment plant is placed onshore whereas the oil production well and injection wells are placed offshore.

31. The system according to claim 25, wherein the reaction region is provided with rigid walls of plastic.

32. A method for using water to recover crude oil from a hydrocarbon-bearing reservoir by water flooding comprising:
providing water that is depleted of bacteria by a process comprising the steps of:
capturing at least a portion of the bacteria from a water source by contacting the water source with superparamagnetic or paramagnetic particles capable of binding the bacteria present in the water source thereby providing a capturing mixture;
applying a magnetic field to remove the bacteria bound to the superparamagnetic or paramagnetic particles from the capturing mixture; and
injecting the water that is depleted of bacteria into an injection well.

33. The method according to claim 32, wherein the superparamagnetic or paramagnetic particles capable of binding the bacteria present in the water source have been functionalized with a moiety capable of specifically binding bacteria present in the water source.

* * * * *